(12) United States Patent
Yan et al.

(10) Patent No.: US 9,128,866 B2
(45) Date of Patent: Sep. 8, 2015

(54) LIGHTWEIGHT POWER MANAGEMENT OF AUDIO ACCELERATORS

(75) Inventors: Shoumeng Yan, Beijing (CN);
Xiaocheng Zhou, Beijing (CN);
Lomesh Agarwal, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 135 days.

(21) Appl. No.: 13/995,999

(22) PCT Filed: Dec. 30, 2011

(86) PCT No.: PCT/CN2011/085008
§ 371 (c)(1),
(2), (4) Date: Jun. 20, 2013

(87) PCT Pub. No.: WO2013/097170
PCT Pub. Date: Jul. 4, 2013

(65) Prior Publication Data
US 2014/0137137 A1 May 15, 2014

(51) Int. Cl.
*G06F 3/00* (2006.01)
*G06F 9/44* (2006.01)
*G06F 9/46* (2006.01)
*G06F 13/00* (2006.01)
*G06F 13/10* (2006.01)
*G06F 1/32* (2006.01)

(52) U.S. Cl.
CPC ............ *G06F 13/102* (2013.01); *G06F 1/3287* (2013.01); *Y02B 60/1282* (2013.01)

(58) Field of Classification Search
None
See application file for complete search history.

(56) References Cited

U.S. PATENT DOCUMENTS

| | | | |
|---|---|---|---|
| 6,771,269 B1* | 8/2004 | Radecki et al. | 345/503 |
| 8,041,848 B2* | 10/2011 | Conroy et al. | 710/22 |
| 2002/0194415 A1* | 12/2002 | Lindsay et al. | 710/305 |
| 2007/0094525 A1* | 4/2007 | Uguen et al. | 713/300 |
| 2011/0117837 A1 | 5/2011 | Fukui et al. | |
| 2011/0185048 A1 | 7/2011 | Yew et al. | |

FOREIGN PATENT DOCUMENTS

| | | |
|---|---|---|
| CN | 2389385 Y | 7/2000 |
| WO | 2013/097170 A1 | 7/2013 |

OTHER PUBLICATIONS

International Search Report and Written Opinion received for PCT application No. PCT/CN2011/085008, mailed on Oct. 4, 2012, 11 pages.

\* cited by examiner

*Primary Examiner* — Craig Dorais
(74) *Attorney, Agent, or Firm* — Jordan IP Law, LLC

(57) ABSTRACT

Systems and methods may provide for using audio output device driver logic to maintain one or more states of an audio accelerator in a memory store, detect a suspend event, and deactivate the audio accelerator in response to the suspend event. In addition, firmware logic of the audio accelerator may be used to detect a resume event with respect to the audio output accelerator, and retrieve one or more states of the audio accelerator directly from the memory store in response to the resume. Thus, the retrieval of the one or more states can bypass the driver logic.

18 Claims, 3 Drawing Sheets

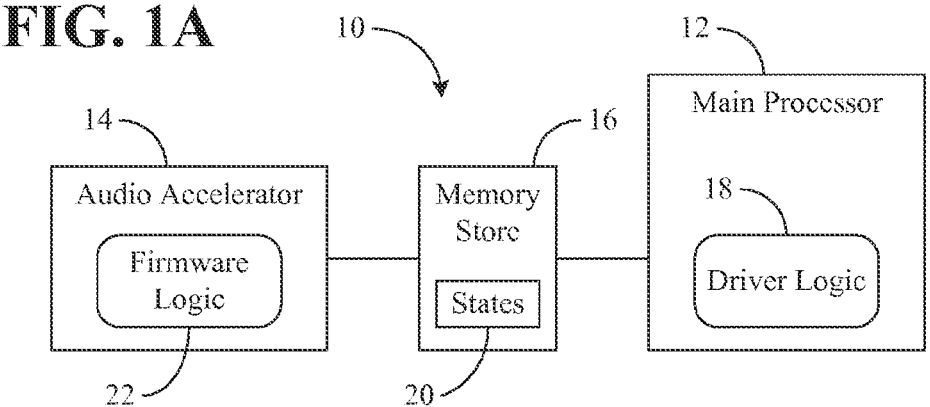
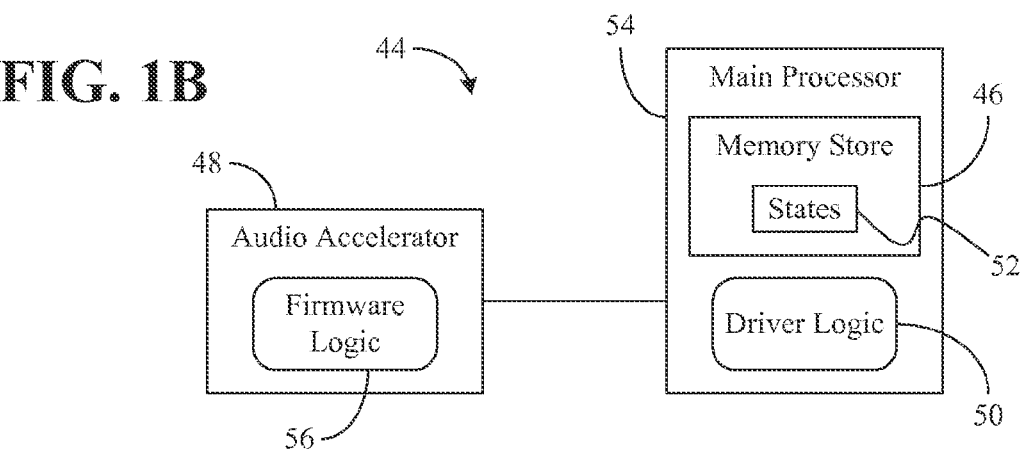
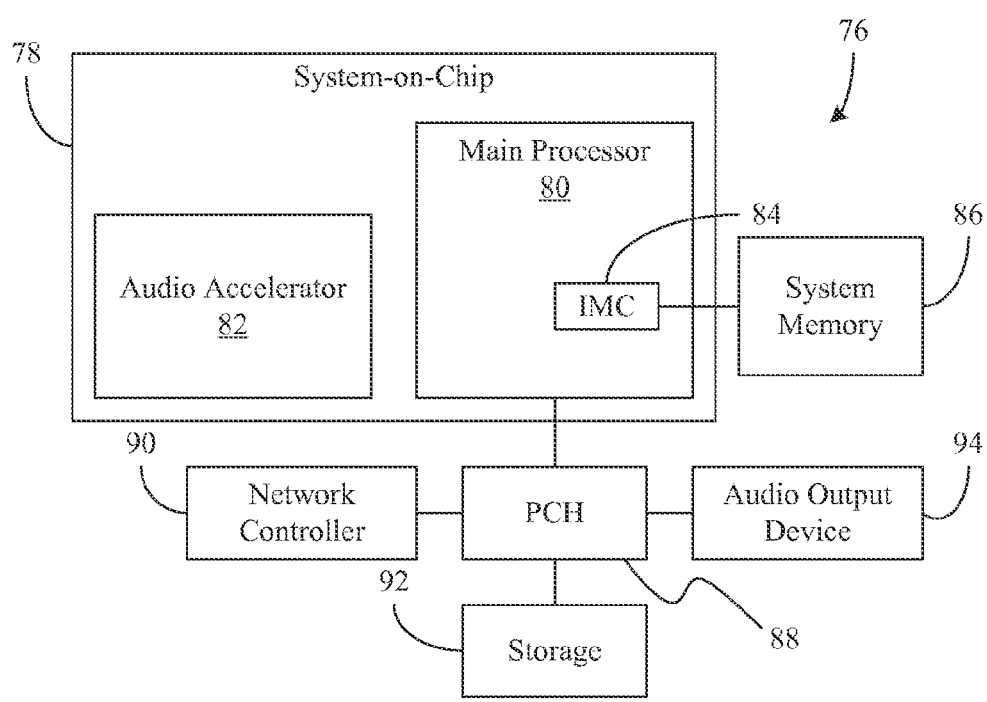
FIG. 3

LIGHTWEIGHT POWER MANAGEMENT OF AUDIO ACCELERATORS

BACKGROUND

1. Technical Field

Embodiments generally relate to media systems. More particularly, embodiments relate to power management of audio accelerators.

2. Discussion

In conventional mobile computing platforms, audio accelerators may be used to reduce the computing load on a CPU (central processing unit) by conducting certain audio-specific functions such as decoding audio formats and post-processing audio streams. During periods of inactivity (e.g., in response to the user halting audio playback), a device driver running on the CPU may place the audio accelerator into a suspend mode in order to conserve power. The process of suspending the audio accelerator and resuming the audio accelerator to the active mode, however, may involve time intensive state restoration operations. In particular, these operations may be considered "heavyweight" in that they could lead to audio response latencies that are noticeable to the user and additional processing overhead that increases power consumption and reduces battery life.

BRIEF DESCRIPTION OF THE DRAWINGS

The various advantages of the embodiments of the present invention will become apparent to one skilled in the art by reading the following specification and appended claims, and by referencing the following drawings, in which:

FIGS. 1A and 1B are block diagrams of examples of audio state management architectures according to embodiments;

FIG. 3 is a block diagram of an example of a system according to an embodiment.

DETAILED DESCRIPTION

Figure 2A:
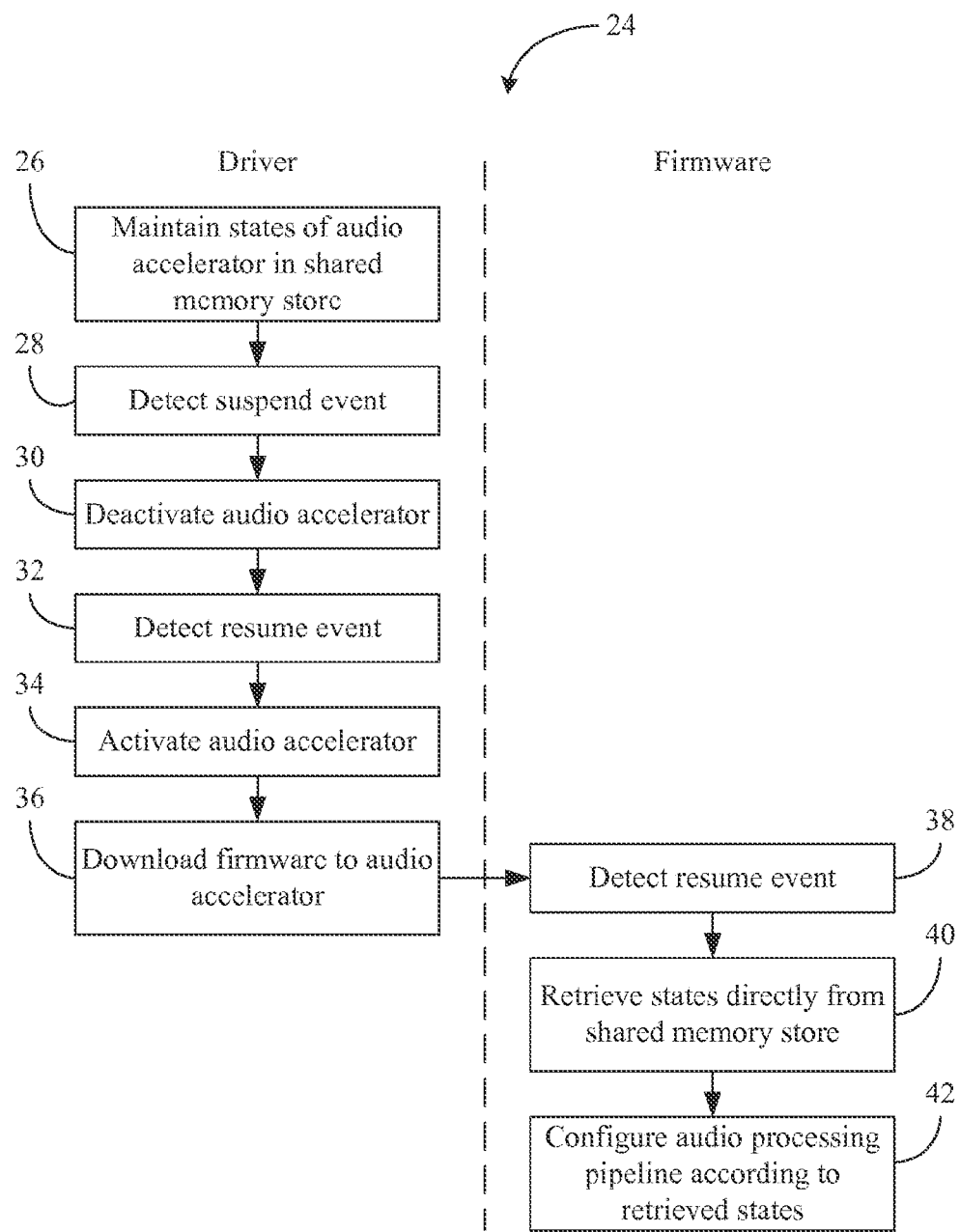
FIGS. 2A and 2B are flowcharts of examples of methods of managing audio states according to embodiments.

Embodiments may include a non-transitory computer readable storage medium having a set of driver logic instructions which, if executed by a processor, cause a computer to maintain one or more states of an audio accelerator in a memory store, and to detect a first event, wherein the driver logic instructions can also deactivate the audio accelerator in response to the first event. In one example, the first event includes at least one of an inactivity condition and a power management condition.

Embodiments may also include an apparatus having a processor with firmware logic to detect a resume event with respect to a media accelerator. Additionally, the firmware logic may retrieve one or more states of the media accelerator directly from a memory store that is shared by driver logic in response to the resume event.

Other embodiments can include a non-transitory computer readable storage medium having a set of driver logic instructions which, if executed by a processor, cause a computer to maintain one or more states of an audio accelerator in a memory store. The driver logic instructions may also cause a computer to detect a first event and deactivate the audio accelerator in response to the first event.

In addition, embodiments may include a system having an audio output device, a memory store, an audio accelerator, and driver logic associated with the audio output device. The driver logic can maintain one or more states of the audio accelerator in the memory store, detect a first event, and deactivate the audio accelerator in response to the first event.

Turning now to FIG. 1A, an architecture 10 is shown in which a main processor 12 and an audio accelerator 14 share a memory store 16. In the illustrated example, the audio accelerator 14 includes firmware logic 22 having audio processing pipeline functionality such as audio format (e.g., MP3/Moving Picture Experts Group-2 Audio Layer III) decoding and audio stream post-processing functionality, wherein driver logic 18 running on the main processor 12 maintains one or more states of the audio accelerator 14 in the shared memory store 16. The audio accelerator 14 may alternatively be another type of media accelerator, such as a video accelerator in which the firmware logic 22 would include video processing pipeline functionality. The states 20 could involve, for example, stream information, pipeline information, and other auxiliary data. Using the driver logic 18 to maintain the states 20 in the shared memory store 16 enables a number of advantages to be achieved with regard to latency and power consumption.

For example, FIG. 2A shows a method 24 of managing audio states in conjunction with a shared memory store. The method 24 may be implemented as one or more sets of logic instructions stored in a machine- or computer-readable storage medium such as random access memory (RAM), read only memory (ROM), programmable ROM (PROM), firmware, flash memory, etc., in configurable logic such as programmable logic arrays (PLAs), field programmable gate arrays (FPGAs), complex programmable logic devices (CPLDs), in fixed-functionality logic hardware using circuit technology such as application specific integrated circuit (ASIC), complementary metal oxide semiconductor (CMOS) or transistor-transistor logic (TTL) technology, or any combination thereof.

Illustrated processing block 26 provides for using driver logic to maintain one or more states of an audio accelerator in the shared memory store. The driver logic may have sufficient knowledge of the audio processing pipeline in order to maintain the states. In response to detecting a suspend event such as an inactivity condition or power management (e.g., power off) condition at block 28, the driver logic may deactivate the audio accelerator at block 30. Thus, the illustrated approach provides for suspending the audio accelerator without the need to pass any state information between the firmware of the audio accelerator and the driver logic, wherein eliminating these suspension-related operations can reduce latency, reduce power consumption and extend battery life. Processing block 32 may detect a resume event such as an activity condition or a power management (e.g., power on) condition, wherein the audio accelerator can be activated at block 34 in response to the resume event. Once the audio accelerator has been activated, the illustrated approach uses the driver logic to download audio processing pipeline firmware to the audio accelerator at block 36.

The audio accelerator firmware may then detect the resume condition/event at block 38 and retrieve the states 20 (FIG. 1A) directly from the shared memory store 16 (FIG. 1A) at block 40. Illustrated block 42 uses the firmware to configure the audio processing pipeline according to the retrieved states. Of particular note is that the firmware may retrieve the states directly from the shared memory store in the example shown, effectively bypassing the driver logic 18 (FIG. 1A) running on the main processor 12 (FIG. 1A). As a result, the illustrated approach eliminates any need to pass state information from the driver logic to the audio accelerator firmware in order to resume the audio accelerator. Eliminating these resume-related operations can further reduce latency, reduce power consumption and extend battery life. As a result, the illustrated approach is lightweight and particularly advantageous for mobile platforms.

FIG. 1B shows an alternative architecture 44 having a memory store 46 that is inaccessible by an audio accelerator 48, wherein the memory store 46 is used by driver logic 50 to maintain one or more states 52 of the audio accelerator. In particular, the illustrated memory store 46 is a local memory of a main processor 54 that runs the driver logic 50. In such a case, the driver logic 50 may be able to maintain the states 52 in the memory store and suspend the audio accelerator 48 without receiving data from firmware logic 56 in the audio accelerator 48, but the driver logic 50 may need to coordinate with the firmware logic 56 in order to resume the audio accelerator 48 to normal operation.

Figure 2B:
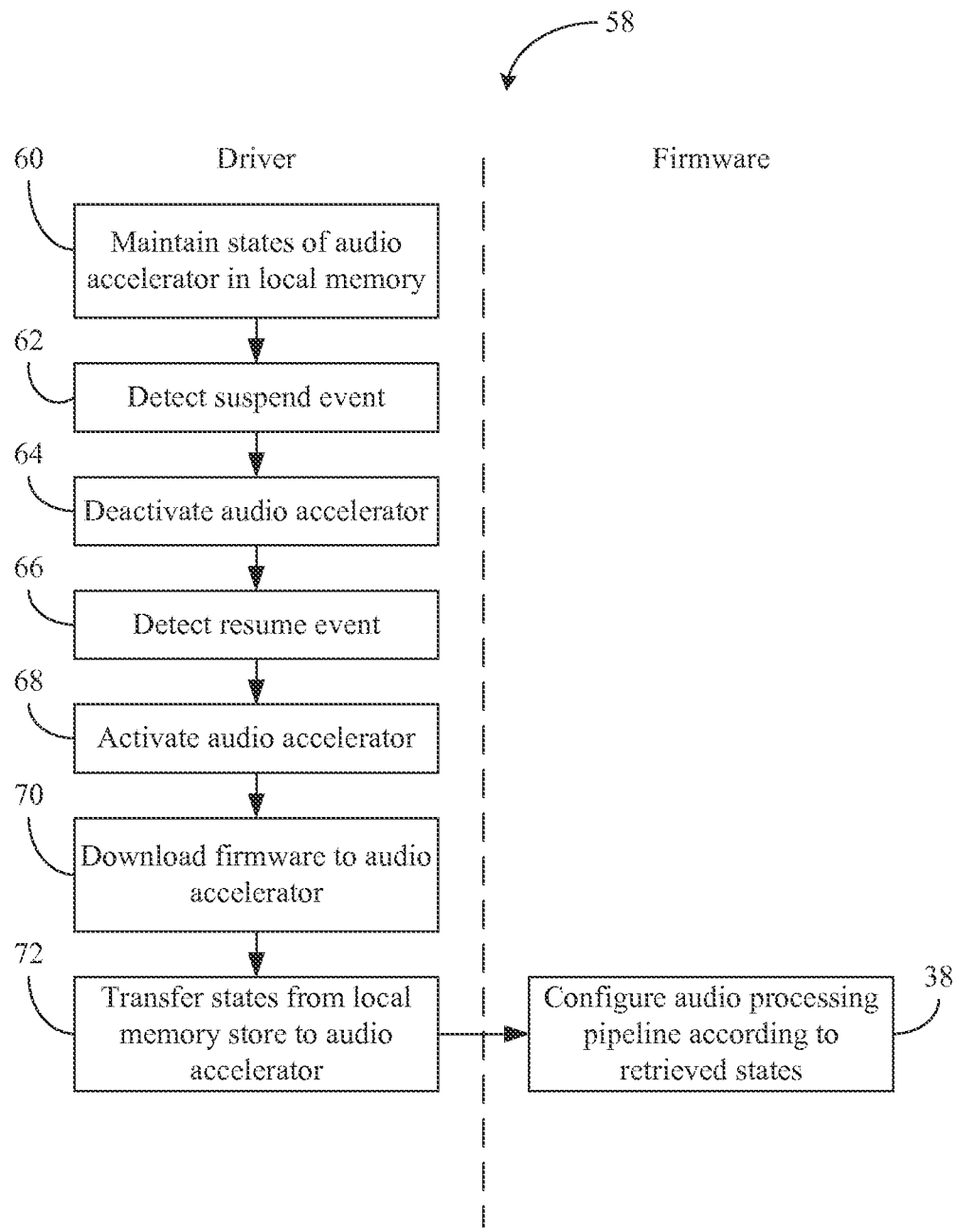

For example, FIG. 2B shows a method 58 of managing audio states in conjunction with a memory store that is inaccessible by an audio accelerator. As already noted, the memory store could be, for example, a local memory store 46 (FIG. 1B) of a main processor 54 (FIG. 1B). The method 58 may be implemented as one or more sets of logic instructions stored in a machine- or computer-readable storage medium such as RAM, ROM, PROM, firmware, flash memory, etc., in configurable logic such as PLAs, FPGAs, CPLDs, in fixed-functionality logic hardware using circuit technology such as ASIC, CMOS or TTL technology, or any combination thereof.

Illustrated processing block 60 provides for using driver logic to maintain one or more states of the audio accelerator in the local memory store, wherein block 62 may detect a suspend event. In response to detecting the suspend event, the driver logic can deactivate the audio accelerator at block 64. Thus, as in the previous example discussed above, the illustrated approach provides for suspending the audio accelerator without the need to pass any state information between the firmware of the audio accelerator and the driver logic. Moreover, eliminating these suspension-related operations may reduce latency, reduce power consumption and extend battery life.

Processing block 66 may detect a resume event, wherein the audio accelerator can be activated at block 68 in response to the resume event. Once the audio accelerator has been activated, the illustrated approach uses the driver logic to download audio processing pipeline firmware to the audio accelerator at block 70. Illustrated block 72 provides for transferring one or more states from the local memory store to the audio accelerator, wherein the downloaded firmware may configure the audio processing pipeline at block 74 according to the transferred states. Thus, although some of the resume-related benefits may not be achieved in the illustrated approach, the method 58 can still be considered lightweight due to the reduced latency, reduced power consumption and extended battery life associated with the elimination of the aforementioned suspension-related operations.

Turning now to FIG. 3, a system 76 is shown. The system 76 may be part of a mobile platform having computing functionality (e.g., personal digital assistant/PDA, laptop, smart tablet), communications functionality (e.g., wireless smart phone), imaging functionality, media playing functionality (e.g., smart television/TV), or any combination thereof (e.g., mobile Internet device/MID). In the illustrated example, the system 76 includes a system-on-chip (SoC) 78 having a main processor 80 and an audio accelerator 82, wherein the main processor 80 could be similar to the main processor 12 (FIG. 1A) or the main processor 54 (FIG. 1B), already discussed. Similarly, the audio accelerator 82 could be similar to the audio accelerator 14 (FIG. 1A) or the audio accelerator 48 (FIG. 2B), already discussed. In the illustrated example, the main processor 80 includes an integrated memory controller (IMC) 84, which may communicate with system memory 86. The system memory 86 may include, for example, dynamic random access memory (DRAM) configured as one or more memory modules such as, for example, dual inline memory modules (DIMMs), small outline DIMMs (SODIMMs), etc.

The illustrated system 76 also includes a platform controller hub (PCH) 88, sometimes referred to as a Southbridge of a chipset, that functions as a host device and may communicate with a network controller 90, storage (e.g., hard disk drive/HDD, optical disk, flash memory, etc.) 92, and an audio output device (e.g., handset speaker, integrate hands-free speaker, etc.) 94. The illustrated main processor 80 may execute driver logic that is configured to maintain one or more states of the audio accelerator 82 in a memory store, detect a suspend event, and deactivate the audio accelerator 82 in response to the first event. In one example, the memory store is shared by the main processor 80 and the audio accelerator 82. Moreover, the audio accelerator 82 can execute firmware logic that detects a resume event with respect to the audio accelerator 82, and retrieves one or more states of the audio accelerator 82 directly from a shared memory store in response to the resume event.

Techniques described herein therefore enable extremely lightweight audio accelerator resume/suspend operations, which may be the primitive operations of accelerator power management. Accordingly, the techniques can improve both the power and performance efficiency of SoC platforms.

Embodiments may therefore provide for a computer implemented method in which an absolute energy break-even time is determined for a first low power state with respect to a current state of a system. A relative energy break-even time may also be determined for the first low power state with respect to a second low power state based on at least in part the absolute energy break-even time. The method may also involve selecting an operating state for the system based on at least in part the relative energy break-even time. In one example, the second low power state is shallower than the first low power state. Thus, using relative energy break-even time may lead to the selection of a more appropriate power state that has a shorter exit latency, wherein the shorter exit latency may in turn provide better performance.

Embodiments can also include a non-transitory computer readable storage medium including a set of instructions which, if executed by a processor, cause a computer to determine an absolute energy break-even time for a first low power state with respect to a current state of a system. The instructions may also cause a computer to determine a relative energy break-even time for the first low power state with respect to a second low power state based on at least in part the absolute energy break-even time. In addition, the instructions can cause a computer to select an operating state for the system based on at least in part the relative energy break-even time.

Other embodiments may include an apparatus having logic to determine an absolute energy break-even time for a first low power state with respect to a current state of a system, and determine a relative energy break-even time for the first low power state with respect to a second low power state based on at least in part the absolute energy break-even time. In addition, the logic can select an operating state for the system based on at least in part the relative energy break-even time.

In addition, embodiments can include a platform having a processor and logic to determine an absolute energy break-even time for a first low power state with respect to a current state of the processor. The logic may also determine a relative energy break-even time for the first low power state with respect to a second low power state based on at least in part the absolute energy break-even time. Additionally, the logic may select an operating state for the processor based on at least in part the relative energy break-even time.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. are used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A system comprising:
an audio output device,
a memory store,
an audio accelerator, wherein the memory store is to be inaccessible by the audio accelerator, and
driver logic associated with the audio output device, the driver logic to,
maintain one or more states of the audio accelerator in the memory store,
detect a first event,
deactivate the audio accelerator in response to the first event,
detect a second event,
activate the audio accelerator in response to the second event,
download firmware logic to the audio accelerator, and
transfer at least one of the one or more states from the memory store to the audio accelerator.

2. The system of claim 1, wherein the firmware logic includes audio pipeline logic.

3. The system of claim 1, further including a processor to execute the driver logic, wherein the memory store is a local memory of the processor.

4. The system of claim 1, wherein the second event is to include at least one of an activity condition and a power management condition.

5. The system of claim 1, wherein the first event is to include at least one of an inactivity condition and a power management condition.

6. An apparatus comprising:
a memory store,
an audio accelerator, wherein the memory store is to be inaccessible by the audio accelerator, and
a processor including driver logic to,
maintain one or more states of the audio accelerator in the memory store,
detect a first event,
deactivate the audio accelerator in response to the first event,
detect a second event,
activate the audio accelerator in response to the second event,
download firmware logic to the audio accelerator, and
transfer at least one of the one or more states from the memory store to the audio accelerator.

7. The apparatus of claim 6, wherein the one or more states are to be maintained in a local memory of the processor and transferred from the local memory of the processor.

8. The apparatus of claim 6, wherein the second event is to include at least one of an activity condition and a power management condition.

9. The apparatus of claim 6, wherein the driver logic includes audio output device driver logic.

10. The apparatus of claim 6, wherein the first event is to include at least one of an inactivity condition and a power management condition.

11. A non-transitory computer readable storage medium comprising a set of firmware logic instructions which, if executed by a processor, cause a computer to:
maintain one or more states of a media accelerator in a memory store, wherein the memory store is to be inaccessible by the media accelerator;
detect a first event;
deactivate the media accelerator in response to the first event;
detect a second event;
activate the media accelerator in response to the second event;
download firmware logic to the media accelerator; and transfer at least one of the one or more states from the memory store to the media accelerator.

12. The medium of claim 11, wherein the firmware logic instructions include audio pipeline logic instructions.

13. The medium of claim 11, wherein the firmware logic instructions include video pipeline logic instructions.

14. A non-transitory computer readable storage medium comprising a set of driver logic instructions which, if executed by a processor, cause a computer to:
   maintain one or more states of an audio accelerator in a memory store, wherein the memory store is to be inaccessible by the audio accelerator;
   detect a first event;
   deactivate the audio accelerator in response to the first event;
   detect a second event;
   activate the audio accelerator in response to the second event;
   download firmware logic to the audio accelerator; and
   transfer at least one of the one or more states from the memory store to the audio accelerator.

15. The medium of claim 14, wherein the one or more states are to be maintained in a local memory of the processor and transferred from the local memory of the processor.

16. The medium of claim 14, wherein the second event is to include at least one of an activity condition and a power management condition.

17. The medium of claim 14, wherein the driver logic instructions include audio output device driver logic instructions.

18. The medium of claim 14, wherein the first event is to include at least one of an inactivity condition and a power management condition.

* * * * *